US010198395B2

(12) United States Patent
Hwang

(10) Patent No.: US 10,198,395 B2
(45) Date of Patent: Feb. 5, 2019

(54) PORT MULTIPLIER SYSTEM AND OPERATION METHOD

(71) Applicant: ASMedia Technology Inc., New Taipei (TW)

(72) Inventor: Wei-Kan Hwang, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/643,495

(22) Filed: Jul. 7, 2017

(65) Prior Publication Data

US 2018/0039597 A1 Feb. 8, 2018

(30) Foreign Application Priority Data

Aug. 3, 2016 (TW) .............................. 105124652 A

(51) Int. Cl.
*G06F 13/36* (2006.01)
*G06F 13/42* (2006.01)

(52) U.S. Cl.
CPC .......... *G06F 13/4282* (2013.01); *G06F 13/36* (2013.01); *G06F 2213/0032* (2013.01)

(58) Field of Classification Search
CPC ................. G06F 13/36; G06F 13/4282; G06F 2213/0032
See application file for complete search history.

(56) References Cited

U.S. PATENT DOCUMENTS

| | | | |
|---|---|---|---|
| 7,404,013 B1* | 7/2008 | Masiewicz ............ | G06F 3/0607 710/17 |
| 7,979,589 B2 | 7/2011 | Oh et al. | |
| 9,063,655 B2 | 6/2015 | Maxwell et al. | |
| 2007/0005850 A1* | 1/2007 | Chang .................... | G06F 3/0613 710/74 |
| 2008/0183921 A1* | 7/2008 | Chang .................... | G06F 3/061 710/58 |
| 2009/0006657 A1* | 1/2009 | Azam ................... | G06F 13/387 710/5 |
| 2014/0149614 A1* | 5/2014 | Pinglikar .............. | G06F 13/385 710/105 |
| 2018/0181514 A1* | 6/2018 | Morgan ................ | G06F 13/385 |

FOREIGN PATENT DOCUMENTS

| CN | 102893267 B | 12/2015 |
|---|---|---|
| TW | 200939028 A | 9/2009 |

* cited by examiner

*Primary Examiner* — Glenn A. Auve
(74) *Attorney, Agent, or Firm* — CKC & Partners Co., Ltd.

(57) ABSTRACT

A port multiplier system is provided. The port multiplier system comprises a first port multiplier and a second port multiplier. The first port multiplier is configured to receive a plurality of first frame information structures from a host. Each of the first frame information structure corresponds to a first port multiplier port number. The first port multiplier sends the first frame information structures that correspond to the first port multiplier port numbers, respectively, to a first downstream port of the first port multiplier according to first port multiplier port number. The second port multiplier is configured to send the first frame information structures that are sent to the first downstream port to a plurality of second downstream ports of the second port multiplier, respectively. An operation method is also provided.

8 Claims, 6 Drawing Sheets

PORT MULTIPLIER SYSTEM AND OPERATION METHOD

CROSS-REFERENCE TO RELATED APPLICATION

This application claims the priority benefit of Taiwan application serial No. 105124652, filed on Aug. 3, 2016. The entirety of the above-mentioned patent application is hereby incorporated by references herein and made a part of specification.

BACKGROUND OF THE INVENTION

Field of the Invention

The disclosure relates to a port multiplier technology and, more specifically to, a port multiplier system and an operation method thereof.

Description of the Related Art

In the art, the total number of ports of a port multiplier is limited by the single port multiplier and cannot be expanded based on the serial advanced technology attachment (SATA). Thus, the application of the port multiplier is limited.

BRIEF SUMMARY OF THE INVENTION

According to an aspect of the disclosure, a port multiplier system is provided. The port multiplier system comprises a first port multiplier and a second port multiplier. The first port multiplier is configured to receive a plurality of first frame information structures from a host. Each of the first frame information structure corresponds to a first port multiplier port number. The first port multiplier sends the first frame information structures that correspond to the first port multiplier port numbers, respectively, to a first downstream port of the first port multiplier according to the first port multiplier port numbers. The second port multiplier is configured to send the first frame information structures that are sent to the first downstream port to a plurality of second downstream ports of the second port multiplier, respectively.

According to another aspect of the disclosure, an operation method is provided. The operation method comprises: receiving a plurality of frame information structures from a host, each of the frame information structures corresponds to a port multiplier port number; sending the frame information structures that correspond to the port multiplier port numbers, respectively, to a first downstream port of a first port multiplier according to the port multiplier port numbers; and sending the frame information structures that are sent to the first downstream port to a plurality of second downstream ports of a second port multiplier, respectively.

In sum, the total number of the ports of the port multiplier system is not limited by the single port multiplier.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. Furthermore, the figures are used only for illustration. For better understanding, same or similar component is denoted by the same or similar reference symbol.

The term "connect/couple" herein refers to "physically or electrically, directly or indirectly connected/coupled", or the cooperation/interacting relationship between two or more components.

Figure 1:
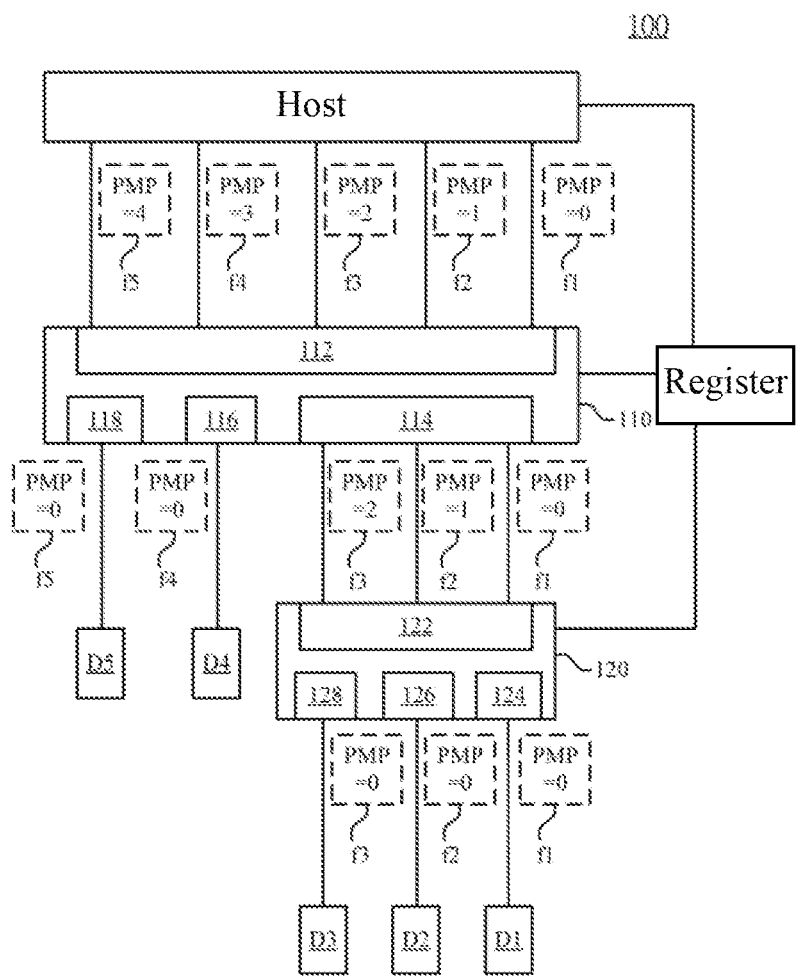
FIG. 1 is a schematic diagram showing a port multiplier system in an embodiment.

Please refer to FIG. 1. FIG. 1 is a schematic diagram showing a port multiplier system 100 in an embodiment. In an embodiment, a port multiplier system 100 at least includes a first port multiplier 110 and a second port multiplier 120. In an embodiment, the first port multiplier 110 and the second port multiplier 120 are port multiplier chips.

In an embodiment, the first port multiplier 110 and the second port multiplier 120 are pre-configured on a mainboard via a circuit layout. That is, the connection between the first port multiplier 110 and the second port multiplier 120 is constant. As shown in FIG. 1, a downstream port 114 of the first port multiplier 110 is electrically connected to an upstream port 122 of the second port multiplier 120. In an embodiment, the first port multiplier 110 and the second port multiplier 120 do not support hot-plug connection therebetween.

In the embodiment, the first port multiplier 110 further includes two downstream ports 116 and 118 for SATA devices. The second port multiplier 120 includes three downstream ports 124, 126 and 128 for the SATA devices. Therefore, in the embodiment, the total number of the ports (i.e., the downstream ports 124, 126, 128, 116 and 118) for the SATA devices is five. The downstream ports and the SATA device support hot-plug connection therebetween.

In an embodiment, the first port multiplier 110 and the second port multiplier 120 are pre-configured on the mainboard. The total number of the ports for the SATA devices is constant in the multiplier system 100. That is, the total number of the ports is a preset number. In an embodiment, the preset number is prewritten into a register R or other memory units.

After a host H sends an inquiry instruction for port count to the first port multiplier 110, the first port multiplier 110 sends a reply instruction for port count to the host H according to the preset number in the register R to inform the host H of the total number of the ports in the port multiplier system 100. With such a configuration, in an embodiment, when the first port multiplier 110 receives the inquiry instruction for port count from the host H, the port count can be directly obtained according to the preset number. Thus, the step that the first port multiplier 110 sends an inquiry instruction for port count to the second port multiplier 120, and the step that the second port multiplier 120 sends a reply of the total number (such as three) of the ports to the first port multiplier 110 do not needed. Thus, the operation efficiency of the port multiplier system 100 is improved.

In the embodiment, the host H sends a plurality of frame information structures (FIS) f1 to f5. The frame information structure is a type of data transmission format. The frame information structures f1 to f5 are sent among the host H, the first port multiplier 110 and the second port multiplier 120. Each of the frame information structure includes a port multiplier port (PMP) column. The PMP column is used for recording a PMP number. In an embodiment, the host H is a computer host, which is not limited herein.

In FIG. 1, the PMP numbers of the frame information structures f1 to f5 correspond to "0", "1", "2", "3" and "4", respectively.

When the upstream port 112 of the first port multiplier 110 is inserted with a port of the host H, the first port multiplier 110 is electrically connected to the host H. At the time, the first port multiplier 110 receives the frame information structures f1 to f5 via the upstream port 112.

In the embodiment, port mapping information corresponds to transmission path information of the frame information structures f1 to f5. In an embodiment, the port mapping information is stored in the register R or other memory units. The port mapping information is dynamically adjustable by a firmware or a logic circuit. When the port mapping information is determined, the frame information structures f1 to f5 are sent by the port multiplier system 100 according to the port mapping information. As shown in FIG. 1, in the embodiment, the frame information structures f1 to f5 are sent to the downstream port 124, 126, 128, 116 and 118, respectively, according to the port mapping information.

In an embodiment, a part of the PMP numbers is assigned to the downstream port 114 by the first port multiplier 110 according to the port mapping information. According to the port mapping information, the frame information structures f1 to f3 are sent to the downstream port 124, 126 and 128 via the downstream port 114, respectively. Thus, the PMP numbers "0", "1", "2" are assigned to the downstream port 114 by the first port multiplier 110. The frame information structure f4 is sent to the SATA device D4 via the downstream port 116. Thus, the PMP number "3" is assigned to the downstream port 116 by the first port multiplier 110. The frame information structure f5 is sent to the SATA device D5 via the downstream port 118. Thus, the PMP number "4" is assigned to the downstream port 118 by the first port multiplier 110.

In the embodiment, the PMP number "0" is assigned to the downstream port 114. When the first port multiplier 110 is inserted to the host H, the downstream port 114 is enabled by the first port multiplier 110. The downstream ports 116 and 118 are disabled by the first port multiplier 110. The downstream ports 116 and 118 waits to be enabled by the host H.

The frame information structures f1 to f3 are sent to the second port multiplier 120 via the downstream port 114. The second port multiplier 120 converts the PMP numbers of the frame information structures f1 to f3 according to the port mapping information and sends the frame information structures f1 to f3 to the downstream ports 124, 126 and 128, respectively. The PMP numbers of the frame information structures correspond to the downstream ports 124 to 128, respectively. In an embodiment, the PMP number "0" corresponds to the downstream port 124. The PMP number "1" corresponds to the downstream port 126. The PMP number "2" corresponds to the downstream port 128. Since the PMP number "0" corresponds to downstream port 124, the second port multiplier 120 converts the PMP number of the frame information structure f1 from "0" to "0" and sends the frame information structure f1 to the SATA device D1 via the downstream port 124. Since the PMP number "1" corresponds to the downstream port 126, the second port multiplier 120 converts the PMP number of the frame information structure f2 from "1" to "0" and sends the frame information structure f2 to the SATA device D2 via the downstream port 126. Since the PMP number "2" corresponds to the downstream port 128, the second port multiplier 120 converts the PMP number of the frame information structure f3 from "2" to "0" and sends the frame information structure f3 to the SATA device D3 via the downstream port 128.

In the embodiment, the PMP number "3" is assigned to the downstream port 116. The PMP number of the frame information structure f4 is converted from "3" to "0" by the first port multiplier 110 according to the port mapping information. The frame information structure f4 is sent to the SATA device D4 via the downstream port 116. The PMP number "4" is assigned to the downstream port 118. The PMP number of the frame information structure f5 is converted from "4" to "0" by the first port multiplier 110 according to the port mapping information. The frame information structure f5 is sent to the SATA device D5 via the downstream port 118.

In such a way, the total number of the ports of the port multiplier system 100 is expanded and not limited to the single port multiplier.

The frame information structures f1 to f5 are sent to the SATA devices by the host H, or the frame information structures f1 to f5 are sent to the host H by the SATA devices. In an embodiment, the second port multiplier 120 receives the frame information structure f2 from the SATA device D2. Since the downstream port 126 corresponds to the PMP number "1", the PMP number of the frame information structure f2 from the downstream port 126 is converted from "0" to "1" by the second port multiplier 120. Then, the frame information structure f2 is sent to the first port multiplier 110 by the second port multiplier 120 via the upstream port 122. Then, the frame information structure f2 is sent to the host H via the upstream port 112 by the first port multiplier 110. In an embodiment, the first port multiplier 110 receives the frame information structure f4 from the SATA device D4. The downstream port 116 corresponds to the PMP number "3", the PMP number of the frame information structure f4 from the downstream port 116 is converted from "0" to "3" by the first port multiplier 110. Then, the frame information structure f4 is sent to the host H via the upstream port 112 by the first port multiplier 110. In such a way, the frame information structures f1 to f5 are sent bi-directionally in the port multiplier system 100.

The frame information structures f1 to f5 include operation instruction columns. The operation instruction column is used for recording operation instructions. The operation instructions are sent to the SATA devices D1 to D5 by the host H when the frame information structures f1 to f5 are sent to the SATA devices D1 to D5 from the host H. Thus, the SATA devices D1 to D5 are controlled by the host H.

The structure of the port multiplier system 100 in FIG. 1 is exemplified only for illustration, which is not limited herein. In an embodiment, the number of the port for the SATA devices in the first port multiplier 110 is one. The number of the ports for the SATA devices in the second port multiplier 120 is three. Therefore, the total number of the ports for the SATA devices in the port multiplier system 100 is four. In the embodiments, the frame information structures are sent in a way similar to that in the embodiment described above, which is not repeated herein.

Figure 2:
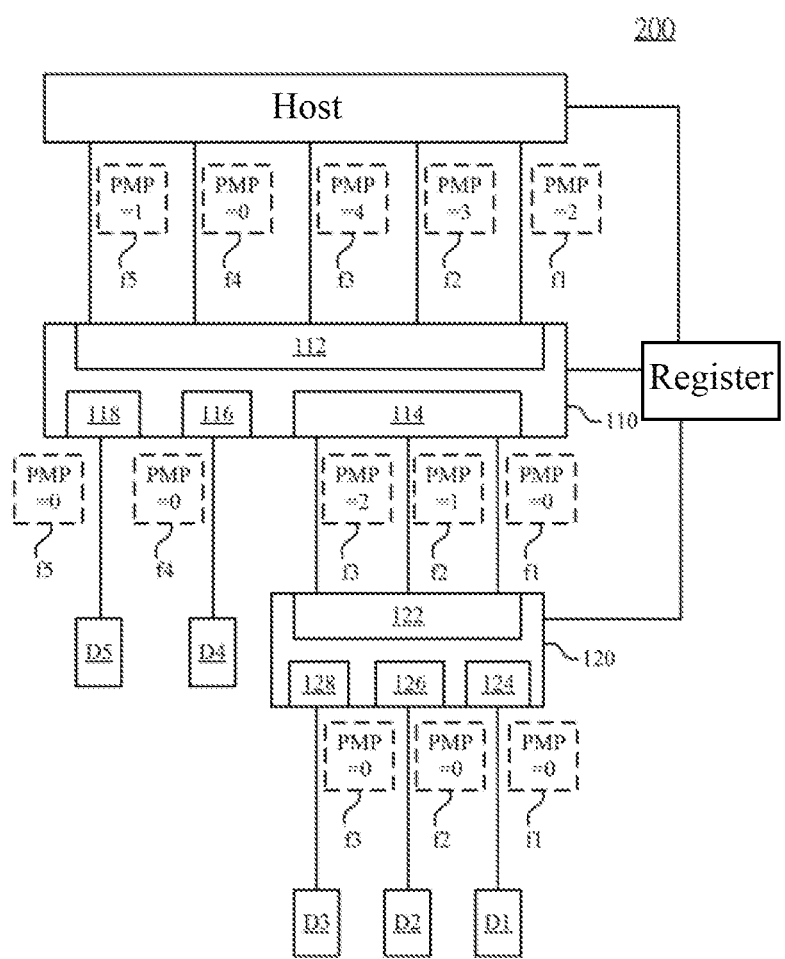
FIG. 2 is a schematic diagram showing a port multiplier system in an embodiment.

Please refer to FIG. 2. FIG. 2 is a schematic diagram showing a port multiplier system 200 in an embodiment. In FIG. 2, the components similar to that in FIG. 1 are denoted by the same reference symbols.

In FIG. 2, the PMP numbers of the frame information structures f1 to f5 received from the host H correspond to "2", "3", "4", "0" and "1", respectively.

In an embodiment, according to the port mapping information, the frame information structures f1 to f5 are sent via the downstream ports 124, 126, 128, 116 and 118, respectively. The PMP numbers "2", "3", "4" are assigned to the downstream port 114 by the first port multiplier 110. The PMP number "0" is assigned to the downstream port 116 by the first port multiplier 110. The PMP number "1" is assigned to the downstream port 118 by the first port multiplier 110.

In the embodiment, another difference with the above embodiment is that the PMP number "0" is assigned to the downstream port 116. When the first port multiplier 110 is inserted to the host H, the downstream port 116 is enabled by the first port multiplier 110. The PMP number "0" is not assigned to the downstream port 114 that is electrically connected to the second port multiplier 120. Thus, when the first port multiplier 110 is inserted to the host H, the downstream port 114 is disabled by the first port multiplier 110. As a result, at the time the first port multiplier 110 is inserted to the host H, the condition that two device signatures are sent to the host H by both two SATA devices (such as the SATA devices D4 and D1) is prevented. Consequently, the port multiplier system 200 conforms to the SATA standard. The device signature is used to indicate a type of the device. In an embodiment, the type of the device is a SATA device, an advanced technology attachment packet interface (ATAPI) device, or a port multiplier. In the embodiment, the downstream port 118 is also disabled by the first port multiplier 110. The downstream ports 114 and 118 waits to be enabled by the host H.

In the embodiment, the PMP number of the frame information structure f1 is converted from "2" to "0" by the first port multiplier 110 according to the port mapping information. The PMP number of the frame information structure f2 is converted from "3" to "1" by the first port multiplier 110 according to the port mapping information. The PMP number of the frame information structure f3 is converted from "4" to "2" by the first port multiplier 110 according to the port mapping information.

The frame information structures f1 to f3 are sent to the second port multiplier 120 by the first port multiplier 110 via the downstream port 114. The second port multiplier 120 converts the PMP numbers of the frame information structures f1 to f3 and sends the frame information structures f1 to f3 to the downstream ports 124, 126 and 128, respectively. Details for the operation can refer above, which is not repeated herein.

The frame information structure f4 is sent to the downstream port 116 by the first port multiplier 110 according to the port mapping information. Thus, the frame information structure f4 is sent to the SATA device D4. In the embodiment, the PMP number of the frame information structure f5 is converted from "1" to "0" by the first port multiplier 110 according to the port mapping information. The frame information structure f5 is sent to the SATA device D5 via the downstream port 118.

When the frame information structure is sent to the host H, different from the above embodiment, the PMP numbers of the frame information structures f1 to f3 from the second port multiplier 120 is converted by the first port multiplier 110 further according to the port mapping information. In an embodiment, the PMP number of the frame information structure f1 from the second port multiplier 120 is converted from "0" to "2" by the first port multiplier 110. The frame information structure f1 is sent to the host H via the upstream port 112. In an embodiment, the PMP number of the frame information structure f2 from the second port multiplier 120 is converted from "1" to "3" by the first port multiplier 110. The frame information structure f2 is sent to the host H via the upstream port 112. In an embodiment, the PMP number of the frame information structure f3 from the second port multiplier 120 is converted from "2" to "4" by the first port multiplier 110. The frame information structure f3 is sent to the host H via the upstream port 112.

The maximum number of the ports of a port multiplier is fifteen as specified by the SATA standard. In an embodiment, the preset number in the register R or in other memory units is fifteen. That is, after the host H sends the inquiry instruction for port count to the first port multiplier 110, the first port multiplier 110 sends the reply instruction for port count to the host H according to the preset number to inform the host H that the total number of the ports in the port multiplier system 200 is fifteen. Then, the host H considers that the fifteen ports in the port multiplier system 200 are available for the SATA devices. In such a way, the host H sends connection request instructions to the fifteen ports, respectively. The fifteen ports include five physical ports (downstream ports 124, 126, 128, 116 and 118) and 10 virtual ports. No connection reply instruction is received by the host H from the virtual ports. Therefore, the virtual ports are not controlled by the host H.

Figure 3:
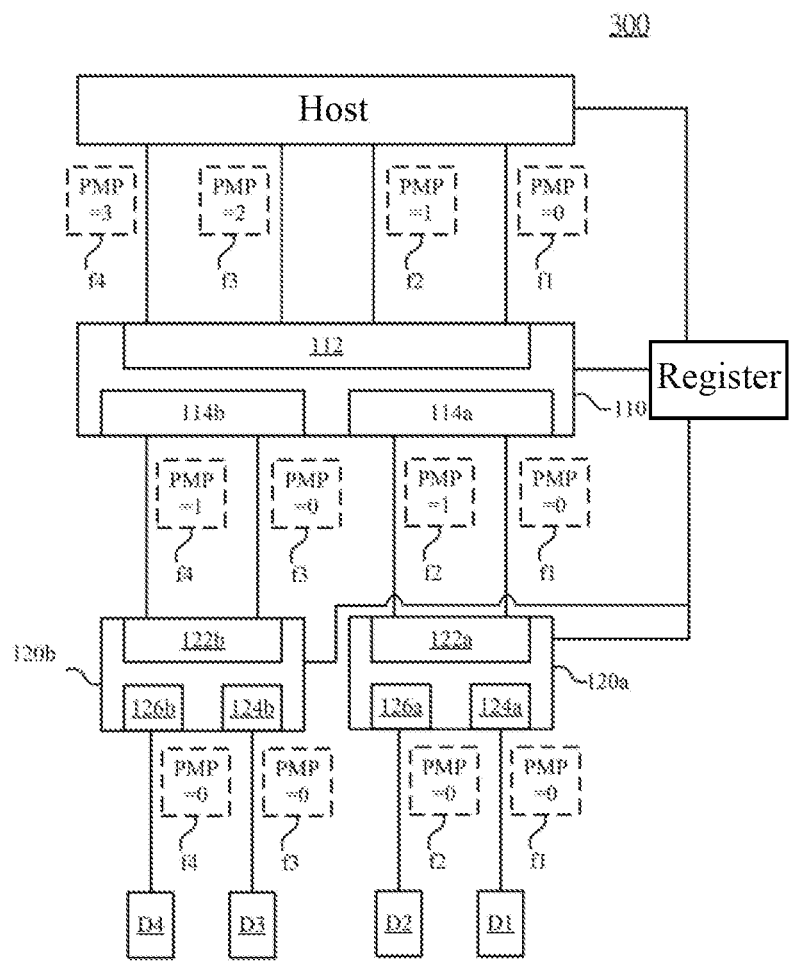
FIG. 3 is a schematic diagram showing a port multiplier system in an embodiment.

Please refer to FIG. 3. FIG. 3 is a schematic diagram showing a port multiplier system 300 in an embodiment. In FIG. 3, the component similar to that in FIG. 1 is denoted by the same reference symbol.

In a port multiplier system 300, the first port multiplier 110 is electrically connected to the second port multipliers 120a and 120b, respectively. A downstream port 114a of the first port multiplier 110 is electrically connected to an upstream port 122a of the second port multiplier 120a. A downstream port 114b of the first port multiplier 110 is electrically connected to an upstream port 122b of the second port multiplier 120b. The SATA devices D1 and D2 are inserted to downstream ports 124a and 126a of the second port multiplier 120a, respectively. The SATA devices D3 and D4 are inserted to downstream ports 124b and 126b of the second port multiplier 120b, respectively.

Similarly, the first port multiplier 110, the second port multiplier 120a and the second port multiplier 120b are pre-configured on the mainboard via a circuit layout. In an embodiment, the first port multiplier 110 and the second port multiplier 120a do not support the hot-plug connection therebetween.

In the embodiment, according to the port mapping information, the PMP numbers "0" and "1" are assigned to the downstream port 114a by the first port multiplier 110. The frame information structures f1 and f2 are sent to the downstream port 114a. The PMP numbers "2" and "3" are assigned to the downstream port 114b by the first port multiplier 110. The first port multiplier 110 converts the PMP numbers of the frame information structure f3 from "2" to "0" and sends the frame information structure f3 to the downstream port 114b. The first port multiplier 110 converts the PMP number of the frame information structure f4 from "3" to "1" and sends the frame information structure f4 to the downstream port 114b.

The second port multiplier 120a receives the frame information structures f1 and f2 via the upstream port 122a. The frame information structure f1 is sent to the SATA device D1 via the downstream port 124a by the second port multiplier 120a according to the port mapping information. The second port multiplier 120a converts the PMP number of the frame information structure f2 from "1" to "0" and sends the frame information structure f2 to the SATA device D2 via the downstream port 126a.

The second port multiplier 120b receives the frame information structures f3 and f4 via the upstream port 122b. The frame information structure f3 is sent to the SATA device D3 by the second port multiplier 120b via the downstream port 124b according to the port mapping information. The second port multiplier 120b converts the PMP number of the frame information structure f4 from "1" to "0" and sends the frame information structure f4 to the SATA device D4 via the downstream port 126b.

Figure 4:
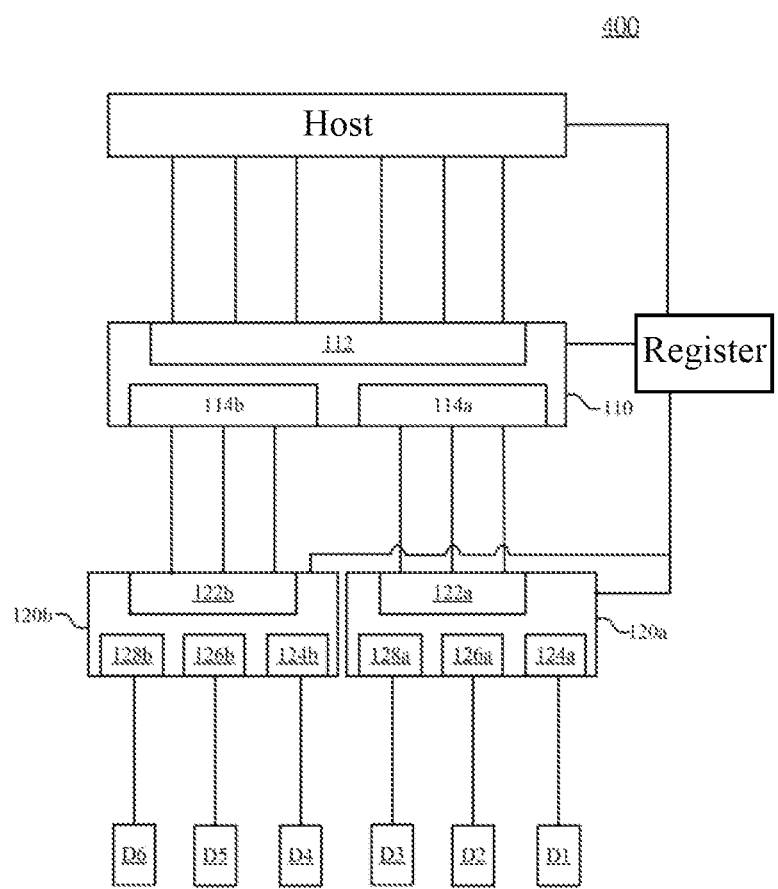
FIG. 4 is a schematic diagram showing a port multiplier system in an embodiment.

Please refer to FIG. 4. FIG. 4 is a schematic diagram showing a port multiplier system 400 in an embodiment. In FIG. 4, the components similar to that in FIG. 3 are denoted by the same reference symbols.

As shown in FIG. 4, in an embodiment, in a second port multiplier 120a, the number of the ports for the SATA devices is three. In the second port multiplier 120b, the number of the ports for the SATA devices is also three. Thus, in the embodiment, the total number of the ports for the SATA devices is six (downstream ports 124a, 126a, 128a, 124b, 126b and 128b) in the port multiplier system 400. The SATA devices D1 to D6 are inserted to the downstream ports, respectively.

Figure 5:
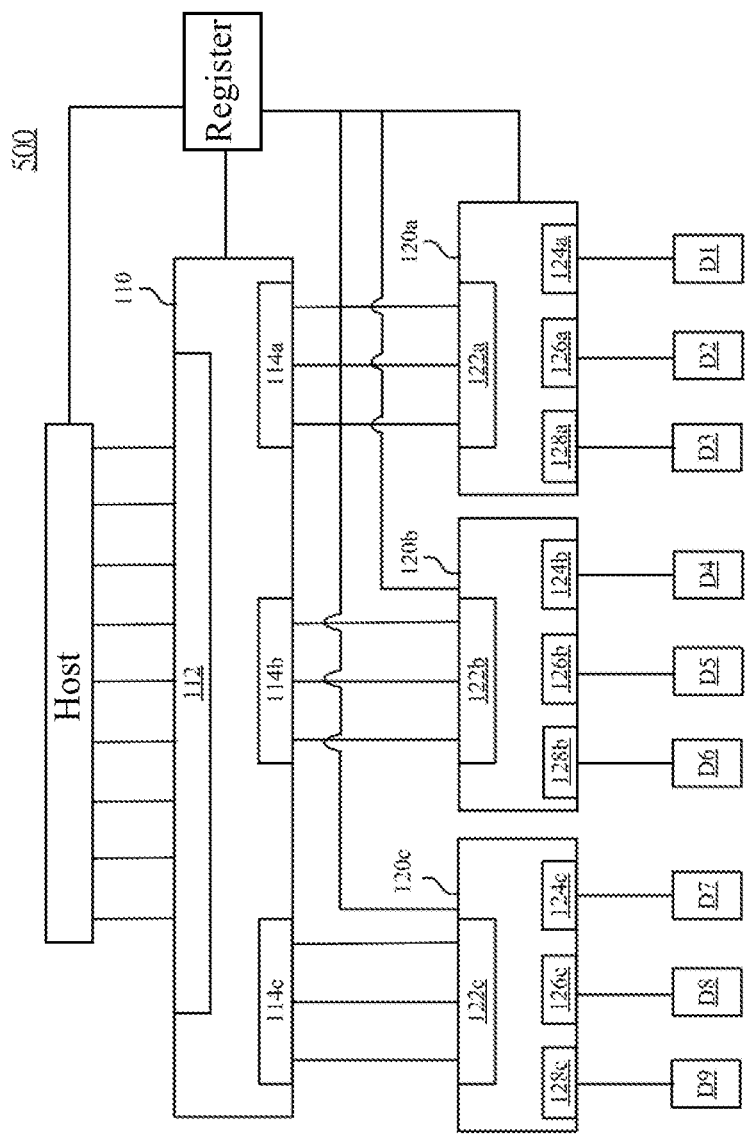
FIG. 5 is a schematic diagram showing a port multiplier system in an embodiment.

Please refer to FIG. 5. FIG. 5 is a schematic diagram showing a port multiplier system 500 in an embodiment. In FIG. 5, the components similar to that in FIG. 3 are denoted by same reference symbols.

In an embodiment, the first port multiplier 110 includes three downstream ports 114a, 114b and 114c. The downstream port 114a, 114b and 114c are electrically connected to the upstream port 122a of the second port multiplier 120a, the upstream port 122b of the second port multiplier 120b and the upstream port 122c of the second port multiplier 120c, respectively. However, each of the second port multipliers 120a, 120b and 120c includes three downstream ports for the SATA device. Therefore, in the port multiplier system 500, the total number of the ports for the SATA devices is nine (the downstream ports 124a, 126a, 128a, 124b, 126b, 128b, 124c, 126c and 128c). The SATA devices D1 to D9 are inserted to the downstream ports, respectively.

In the embodiments, the frame information structures are sent in a way similar to that in the embodiment described above, which is not repeated herein.

Figure 6:
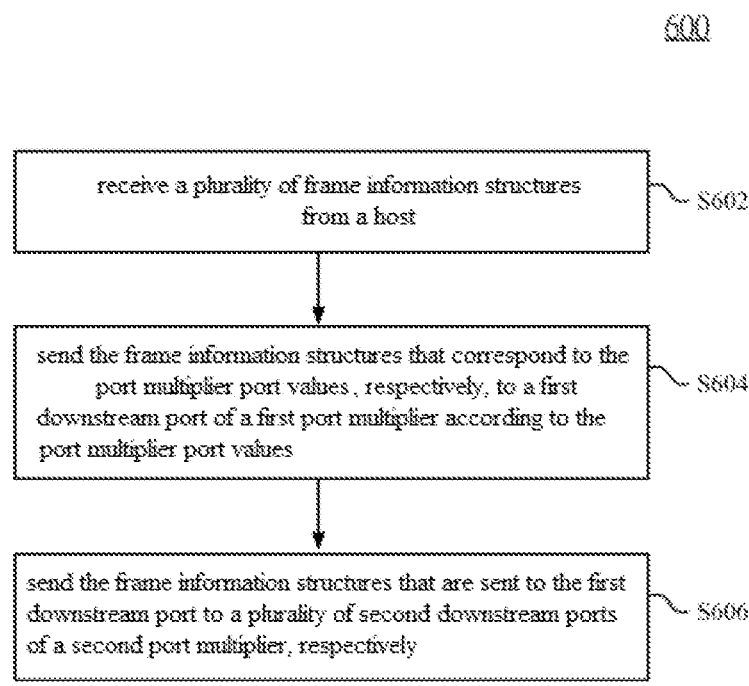
FIG. 6 is a flow chart of an operation method in an embodiment.

FIG. 6 is a flow chart of an operation method 600 in an embodiment. In embodiments, an operation method 600 is adapted to be applied to the port multiplier system 100 in FIG. 1, the port multiplier system 200 in FIG. 2, the port multiplier system 300 in FIG. 3, the port multiplier system 400 in FIG. 4, or the port multiplier system 500 in FIG. 5.

Please refer to FIG. 1 and FIG. 6, the operation method 600 is described in combination with the operation of the port multiplier system 100.

In step S602, the first port multiplier 110 receives a plurality of the frame information structures f1 to f3 from the host H. Each of the frame information structure f1 to f3 corresponds to a port multiplier port (PMP) number. In an embodiment, the PMP numbers of the frame information structures f1 to f3 correspond to "0", "1" and "2", respectively.

In step S604, the first port multiplier 110 sends the frame information structures that correspond to the PMP numbers, respectively, to the downstream port 114 of the first port multiplier 110 according to the PMP numbers. In an embodiment, the first port multiplier 110 sends the frame information structures f1 to f3 to the downstream ports 114.

In step S606, the second port multiplier 120 sends the frame information structures (which are sent to the downstream port 114) to the downstream ports of the second port multiplier 120, respectively. In an embodiment, the second port multiplier 120 sends the frame information structures f1 to f3 to the downstream ports 124 to 128, respectively.

In the embodiment, the steps of the operation method 400 are exemplified only for description. The steps of the operation method 400 are not limited to be performed according to the sequence described herein. That is, the sequence for performing the steps of the operation method 400 is changeable. In an embodiment, in some circumstance, all/part of the steps are performed simultaneously.

In embodiments, in the port multiplier system, the total number of the ports is not limited to the single port multiplier.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A port multiplier system comprising:
a first port multiplier comprising a first downstream port and a second downstream port and configured to receive a plurality of first frame information structures from a host, wherein each first frame information structure corresponds to a respective first port multiplier port number of a plurality of first port multiplier port numbers, and the first port multiplier port numbers are assigned to the first downstream port and the second downstream port respectively; and
a second port multiplier connected to the first downstream port and comprising a plurality of third downstream ports,
wherein when the host starts to operate, the first port multiplier is configured to enable one of the first downstream port and the second downstream port that is assigned with the port multiplier port number of 0 and disable the other one of the first downstream port and the second downstream port that is not assigned with the port multiplier port number of 0.

2. The port multiplier system according to claim 1, wherein the first port multiplier is further configured to inform the host of a total number of the ports according to a preset number stored in a register.

3. The port multiplier system according to claim 2, wherein the preset number is equal to a total number of the second downstream ports and the third downstream ports.

4. The port multiplier system according to claim 1, wherein the first port multiplier is configured to convert the first port multiplier port numbers to second port multiplier port numbers according to a port mapping information, and the second port multiplier is further configured to send the first frame information structures from the first downstream port to the third downstream ports, respectively, according to the second port multiplier port numbers.

5. The port multiplier system according to claim 4, wherein the second port multiplier is further configured to receive at least a second frame information structure from at least a serial advanced technology configuration device, and converts a third port multiplier port number of the second frame information structure to a corresponding second port multiplier port number in the second port multiplier port numbers according to the port mapping information.

6. The port multiplier system according to claim 5, wherein the first port multiplier is further configured to convert the second port multiplier port number of the second frame information structure according to the port mapping information and send the second frame information structure to the host.

7. An operation method applied to a port multiplier system, wherein the port multiplier system comprises a first port multiplier and a second port multiplier; the first port multiplier comprises a first downstream port and a second downstream port; the second port multiplier is connected to the first downstream port, the operation method comprising:
    receiving a plurality of frame information structures from a host, each frame information structures corresponds to a respective first port multiplier port number of a plurality of first port multiplier port numbers;
    assigning the first port multiplier port numbers to the first downstream port and the second downstream port of the first port multiplier, respectively; and
    when the host starts to operate, enabling one of the first downstream port and the second downstream port that is assigned with the port multiplier port number of 0 and disabling the other one of the first downstream port and the second downstream port that is not assigned with the port multiplier port number of 0.

8. The operation method according to claim 7, further comprising:
    informing the host of a total number of the ports according to a preset number stored in a register.

* * * * *